(12) United States Patent
Shi et al.

(10) Patent No.: US 9,503,709 B2
(45) Date of Patent: Nov. 22, 2016

(54) MODULAR CAMERA ARRAY

(71) Applicant: INTEL CORPORATION, Santa Clara, CA (US)

(72) Inventors: Jianbo Shi, Philadelphia, PA (US); Daniel C. Middleton, Independence, MN (US)

(73) Assignee: Intel Corporation, Santa Clara, CA (US)

(*) Notice: Subject to any disclaimer, the term of this patent is extended or adjusted under 35 U.S.C. 154(b) by 390 days.

(21) Appl. No.: 14/140,929

(22) Filed: Dec. 26, 2013

(65) Prior Publication Data

US 2014/0232831 A1 Aug. 21, 2014

Related U.S. Application Data

(60) Provisional application No. 61/766,324, filed on Feb. 19, 2013.

(51) Int. Cl.
*H04N 13/02* (2006.01)

(52) U.S. Cl.
CPC ...... *H04N 13/0282* (2013.01); *H04N 13/0242* (2013.01)

(58) Field of Classification Search
USPC .......................................................... 348/48
See application file for complete search history.

(56) References Cited

U.S. PATENT DOCUMENTS

| 2006/0152589 | A1* | 7/2006 | Morrison | G06K 9/209 348/208.1 |
|---|---|---|---|---|
| 2010/0141928 | A1* | 6/2010 | Embry | G01N 21/4133 356/5.01 |
| 2011/0069148 | A1* | 3/2011 | Jones | H04N 5/232 348/36 |
| 2012/0188391 | A1* | 7/2012 | Smith | H04N 5/2258 348/222.1 |

\* cited by examiner

*Primary Examiner* — Paulos M Natnael
(74) *Attorney, Agent, or Firm* — International IP Law Group, P.L.L.C.

(57) ABSTRACT

Devices, systems and methods employing modular camera arrays are described. A two-dimensional array of cameras may be arranged in a non-rectangular array. A first camera, a second camera, and a third camera in the array may be located approximately equidistant from each other, and/or may be arranged approximately in an equilateral triangle, an isosceles triangle, a scalene triangle, and/or a right triangle.

27 Claims, 8 Drawing Sheets

MODULAR CAMERA ARRAY

PRIORITY CLAIM

This application claims the benefit of the filing date of U.S. Provisional Application Ser. No. 61/766,324 entitled "MODULAR CAMERA ARRAY" and filed on Feb. 19, 2013.

BACKGROUND

Devices and/or systems employing multi-camera arrays have traditionally been used for various computer vision applications including depth extraction, temporal resolution, and high dynamic range.

Ideally, a camera array's geometric pattern allows for efficient sampling of the light from a scene (often called the "light field"). Further, the separation of cameras within the array can provide the basis for depth calculations in, for example, stereo vision depth extraction applications. In such applications, the number of cameras and the angle between the cameras in the array can affect the accuracy of any corresponding depth map. Similarly, geometric characteristics of a multi-camera array can impact sampling a scene for time (e.g., high-speed cameras) and light intensity (e.g. high dynamic range).

Traditional camera arrays typically take the form of a one-dimensional strip of cameras or a two-dimensional rectangular grid of cameras where the individual cameras are arranged orthogonally with respect to each other. Some existing approaches employ cameras arrayed on a convex hull. However, these existing approaches either tend to have insufficient overlapping fields of view between individual cameras in the array, or exhibit redundancy and/or occlusions resulting in less than desirable efficiency and/or robustness.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The present disclosure is related to systems, devices and methods employing camera arrays.

Figure 1:
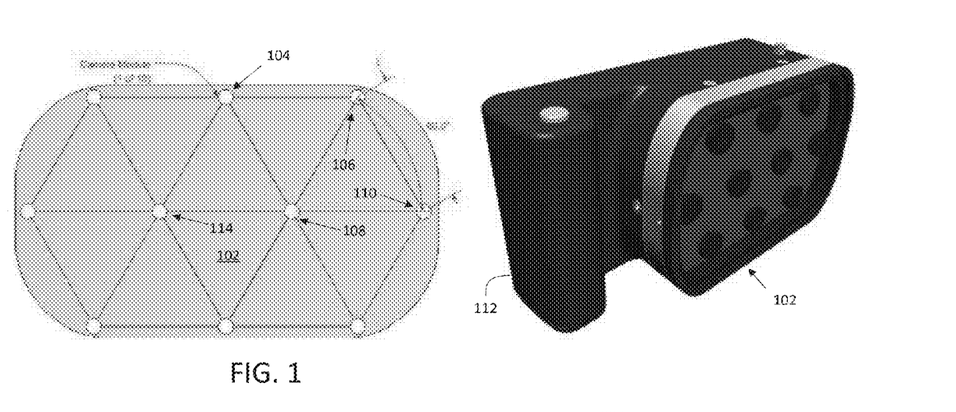
FIGS. 1-4 are illustrative diagrams of example camera arrays.

FIG. 1 illustrates an example camera array 102 in accordance with the present disclosure. As shown in this example, array 102 includes a two-dimensional (2D) assembly of ten individual cameras 104 arranged such that a two-dimensional array of camera arranged such that any particular camera 104 in array 102 is approximately equidistant from all immediately adjacent cameras in the array. Thus, three adjacent camera modules 106, 108, and 110, form an equilateral triangle where the distance between camera 106 and camera 108 approximately equals (e.g., within manufacturing and/or design tolerances) the distance between camera 108 and camera 110, and the distance between camera 110 and camera 106. Because cameras 106, 108, and 110, form an equilateral triangle, the angle between the axis connecting camera 106 to camera 108 and the axis connecting camera 108 to camera 110 subtends approximately 60° as does the angle between the axis connecting camera 108 to camera 110 and the axis connecting camera 110 to camera 106, and so forth.

As shown in FIG. 1, example array 102 may be included in a modular camera system 112. System 112 may include one or more logic modules (e.g., software, firmware, and/or hardware), not shown in FIG. 1 but described in greater detail below, that may be used to capture and process image data using array 102. Further, such logic may be used to generate depth data utilizing the image data captured by array 102. Because array 102 uses less cameras than a conventional rectangular orthogonal camera array to generate sampling returns, employing array 102 may reduce both manufacturing costs and the amount of computation required to obtain depth data.

Figure 2:
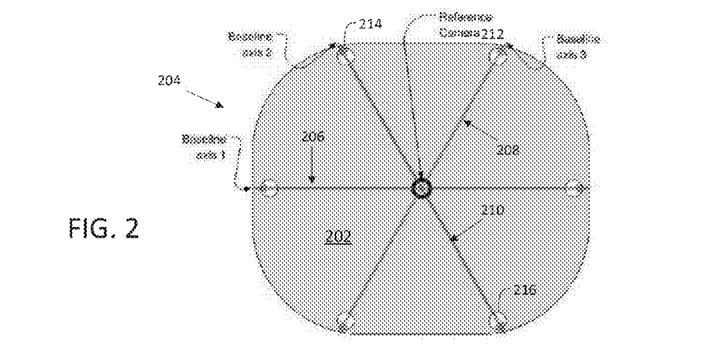

FIG. 2 illustrates another example 2D camera array 202 in accordance with the present disclosure. In this example, array 202 includes seven cameras 204 arranged such that each of three non-orthogonal sampling axes 206, 208, and 210 include three cameras per axis. In this example, imaging data obtained from a central reference camera 212 can be compared to imaging data obtained from two different comparison cameras located the same distance from camera 212 along each of axes 206, 208, and 210. Depth algorithms applied to image data obtained from conventional camera arrays having rectangular rows and columns of cameras repeating along orthogonal axes tend to fail in capture environments having repeating structures (e.g., a picket fence) that align with the rectangular array. By contrast, depth algorithms applied to image data obtained from camera arrays employing non-orthogonal arrangements in accordance with the present disclosure, such as arrays 102 and 202, reduce the likelihood that an imaged structure may repeat along a sampling axis and thus may be more robust.

Figure 3:
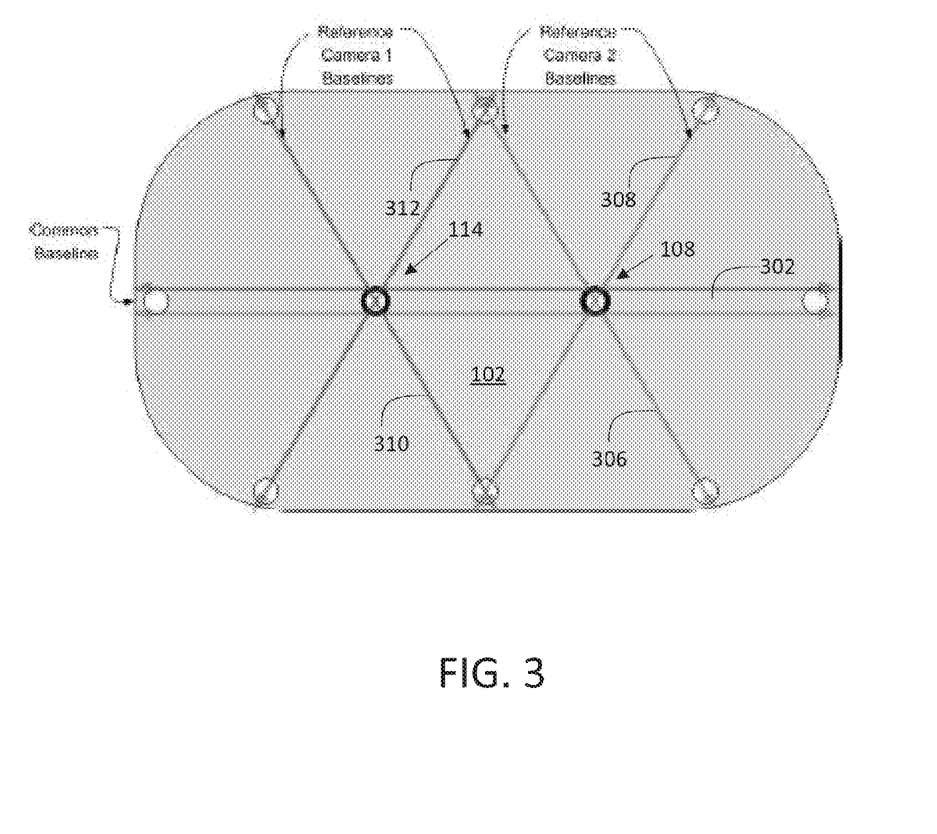

FIG. 3 illustrates example camera array 102 of FIG. 1 in greater detail. As shown, in ten camera array 102, two cameras 108 and 114 may be used as reference cameras. Cameras 108 and 114 share a common baseline axis 302 while having distinct reference baseline axes: 306 and 308 associated with reference camera 108; and 310 and 312 associated with reference camera 114. By using two reference cameras within array 102, robustness may be enhanced by using occlusion reasoning to automatically correct errors in resulting depth maps.

Figure 4:
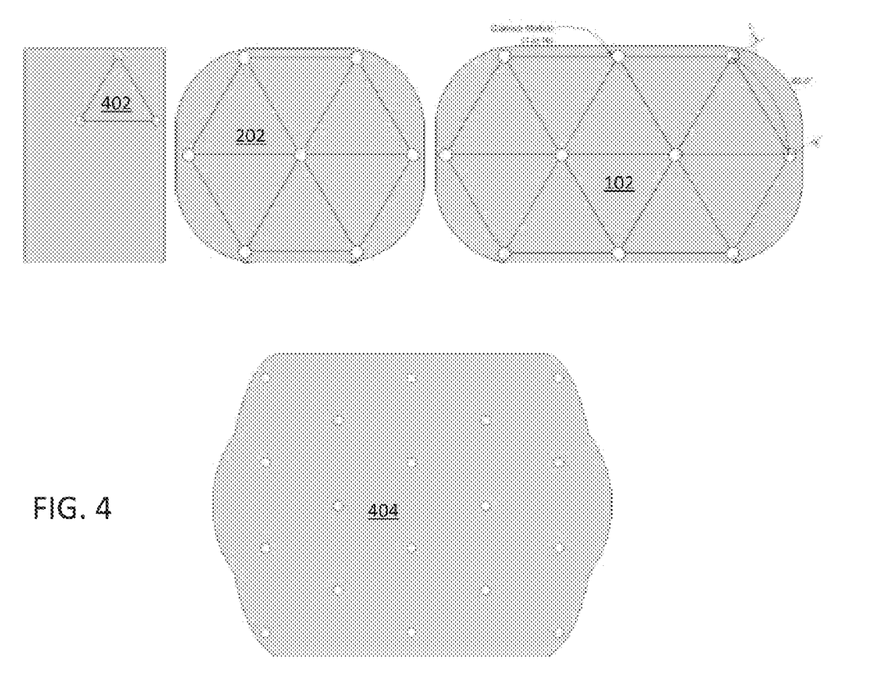

While FIGS. 1-3 illustrate example camera arrays having seven and ten cameras the present disclosure is not limited to these example camera arrays either in number of cameras employed or in the particular physical arrangements of example arrays 102 and 202. Thus, as shown in FIG. 4, various 2D camera arrays may be employed in accordance with the present disclosure. For example, FIG. 4 illustrates an example 2D three camera array 402, and an example 2D eighteen (18) camera array 404 in addition to seven camera array 202, and ten camera array 102 described above. Clearly, various arrays in accordance with the present disclosure may be utilized in various form factors other than the form factors of the example arrays described herein. Thus, the present disclosure provides scalability for different device and/or system requirements without requiring consequent changes to depth algorithms.

Further, while the various example 2D camera arrays are described herein as having individual cameras arranged along various axes, those of skill in the art will recognize that individual cameras may be approximately positioned along various axes and still provide the attributes described herein. Thus, referring to the example of FIG. 2, while the individual cameras of example array 202 have been described herein as being arranged along axes 206, 208, and 210, the various individual cameras may be approximately arranged along axes 206, 208, and 210 such that some individual cameras may not be exactly placed along a particular axis. For instance, reference camera 212 and cameras 214 and 216 may be arranged approximately along axis 210 such that axis 210 does not necessarily pass exactly through the center of each camera 212, 214, and 216.

Figure 5:
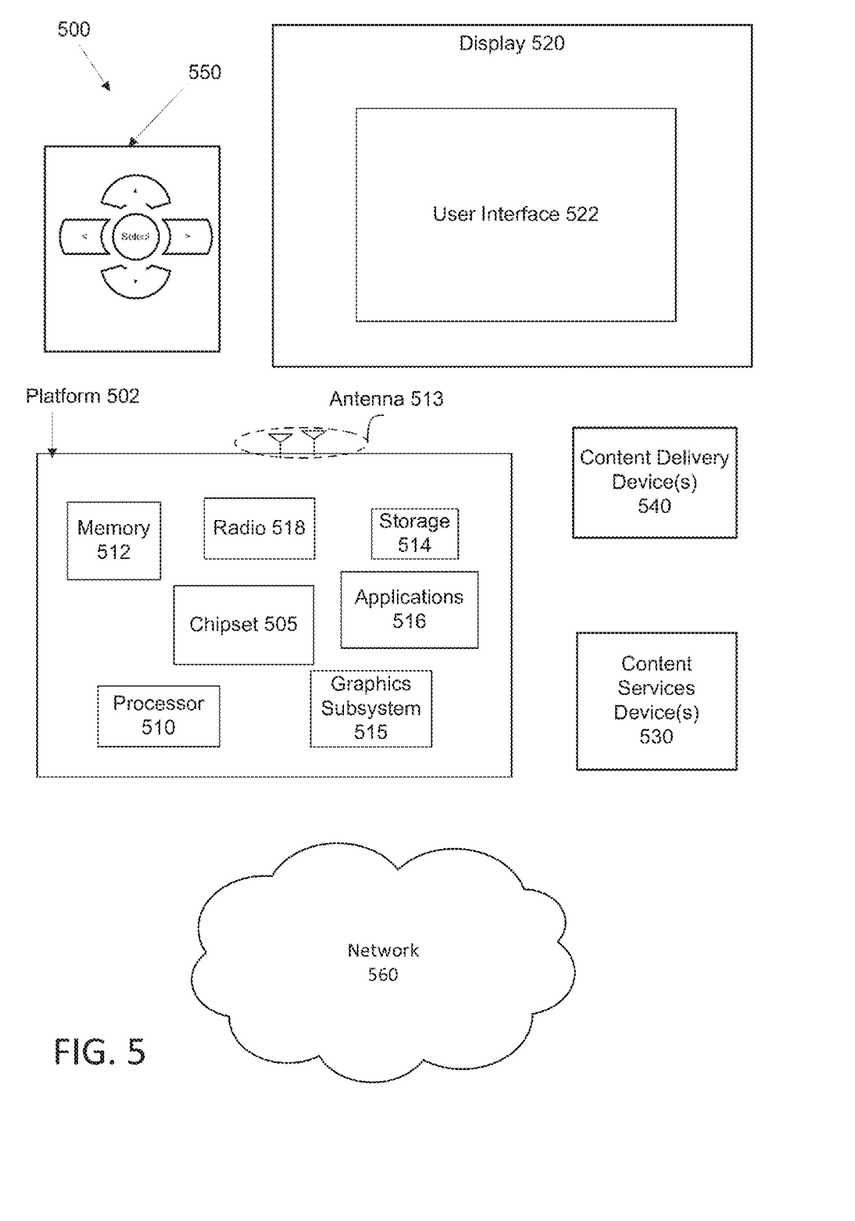
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, antenna 513, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 510 may be dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface (HDMI), DisplayPort, wireless HDMI, and/or wireless HD compliant techniques. Graphics subsystem 515 may be integrated into processor 510 or chipset 505. In some implementations, graphics subsystem 515 may be a stand-alone device communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In various embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In various embodiments, controller 550 may not be a separate component but may be integrated into platform 502 and/or display 520. The present disclosure, however, is not limited to the elements or in the context shown or described herein.

In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
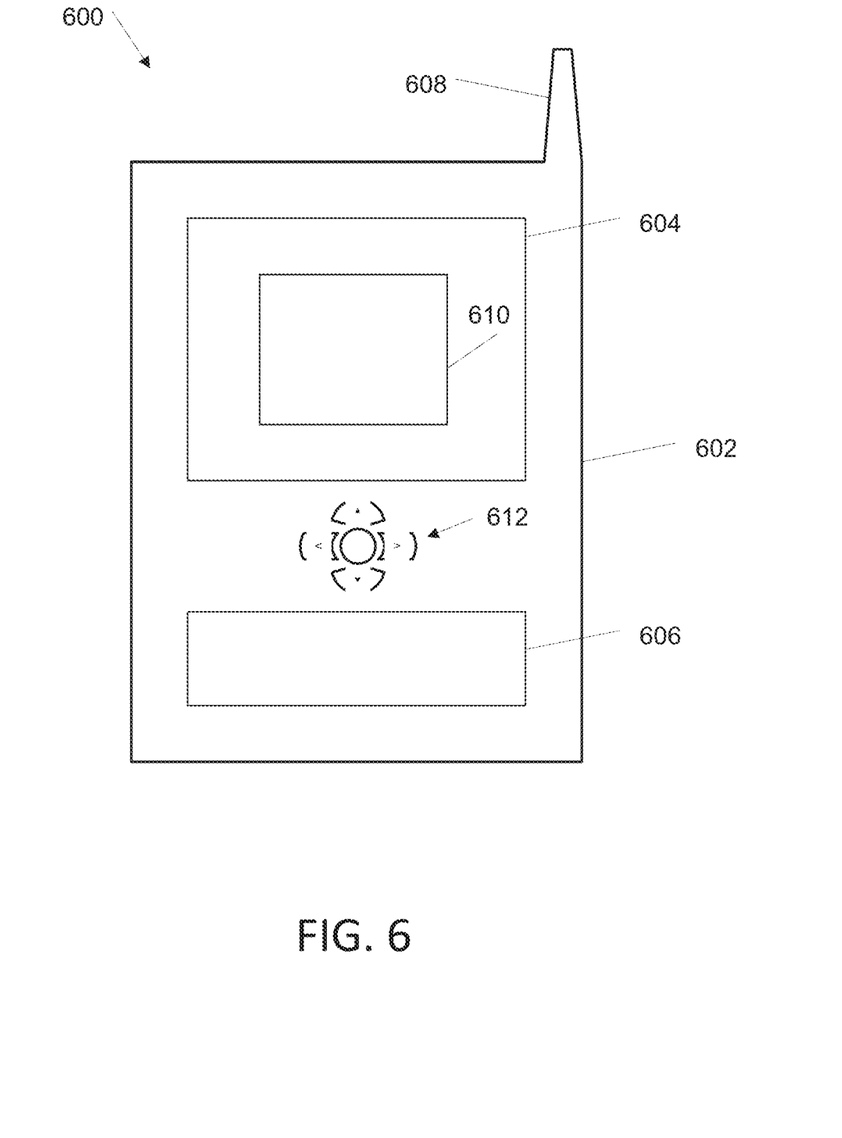
FIG. 6 illustrates an example device, all arranged in accordance with at least some implementations of the present disclosure.

As described above, system 500 may be embodied in varying physical styles or form factors. FIG. 6 illustrates implementations of a small form factor device 600 in which system 600 may be embodied. In various embodiments, for example, device 600 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

In some embodiments (as illustrated, for example, in FIGS. 1, 2, 3, and/or 4) a repeated triangular pattern of cameras is implemented. For example, the cameras are placed at vertices of equilateral triangles. This arrangement provides several benefits over a row, orthogonal grid, or curved hull. Benefits include efficiency (bill of material or BOM cost and computer overhead improvements), robustness (reduces errors related to repeated patterns and occlusions), scalability (design scales to different device types and requirements without change to dependent algorithms), and industrial design flexibility (design pattern conforms to different shapes such as rounded corners).

In some embodiments, camera patterns are used that do not fall on a line or a grid. For example, according to some embodiments, 5 or 6 cameras (or some other number of cameras) may be arranged in odd patterns. For example, in some embodiments a diamond of 4 cameras may be arranged with another pair of cameras off to the side. In some embodiments, cameras may be placed for algorithmic and/or industrial design/aesthetics reasons.

Additionally, other arrangements of cameras are available according to some embodiments. For example, as illustrated in FIGS. 1, 2, 3, and/or 4) an arrangement of equilateral triangles (and/or approximately equilateral triangles) may be implemented (for example, cameras 106, 108, and 110 in FIG. 1). For example, as illustrated in FIGS. 1, 2, 3, and/or 4) an arrangement of isosceles triangles (and/or approximately isosceles triangles) may be implemented (for example, cameras 104, 106, and 110 in FIG. 1). For example, as illustrated in FIGS. 1, 2, 3, and/or 4) an arrangement of scalene triangles and/or right triangles (and/or approximately scalene triangles and/or approximately right triangles) may be implemented (for example, cameras 104, 106, and the bottom right camera in FIG. 1).

Figure 7:
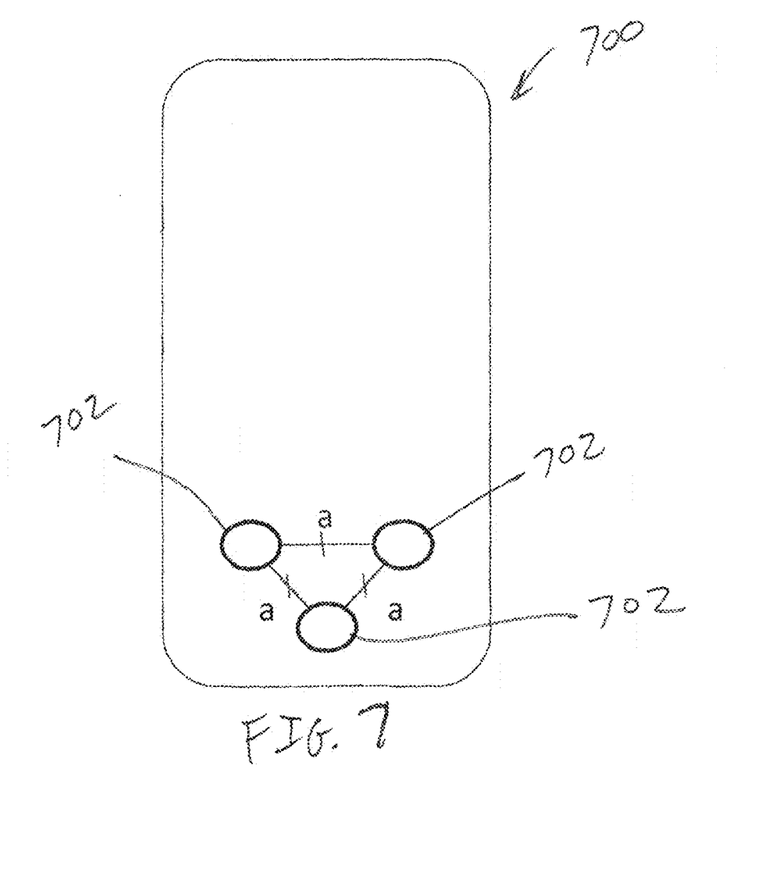
FIGS. 7-9 are illustrative diagrams of example camera arrays.

FIG. 7 illustrates an example camera array 700 in accordance with the present disclosure. As shown in this example, array 700 includes a two-dimensional (2D) assembly of three individual cameras 702 arranged such that a two-dimensional array of camera arranged such that the three cameras 702 form an equilateral triangle where the distance "a" between the cameras approximately equals (e.g., within manufacturing and/or design tolerances) the distance "a" between the other cameras. Because cameras 702 form an equilateral triangle, the angle between the axis connecting each set of cameras subtends approximately 60°. Although camera array 700 in FIG. 7 illustrates three cameras 702, any number of cameras may be included in some embodiments. For example, additional cameras may be included in camera array 700 that form additional equilateral triangles, other types of triangles, other shapes of cameras, and/or any arrangement of cameras that do not fall along a line or a grid, etc.

As shown in FIG. 7, example array 700 may be included in a modular camera system that may include one or more logic modules (e.g., software, firmware, and/or hardware), not shown in FIG. 7, that may be used to capture and process image data using array 700. Further, such logic may be used to generate depth data utilizing the image data captured by array 700. Because array 700 uses less cameras than a conventional rectangular orthogonal camera array to generate sampling returns, employing array 700 may reduce both manufacturing costs and the amount of computation required to obtain depth data.

Figure 8:
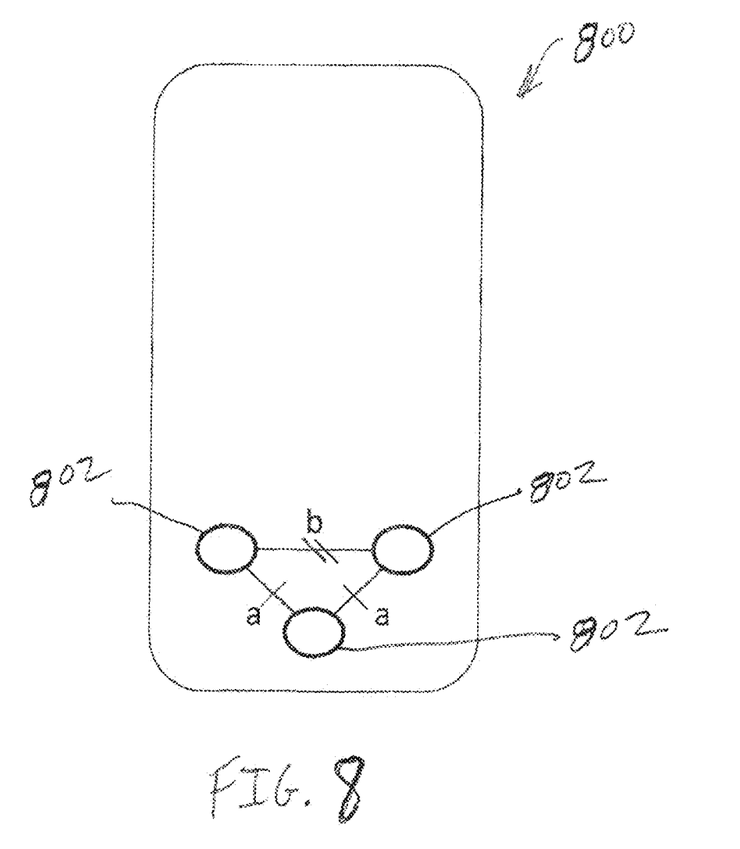

FIG. 8 illustrates an example camera array 800 in accordance with the present disclosure. As shown in this example, array 800 includes a two-dimensional (2D) assembly of three individual cameras 802 arranged such that a two-dimensional array of camera arranged such that the three cameras 802 form an isosceles triangle where the distance "a" between two of the cameras approximately equals (e.g., within manufacturing and/or design tolerances) the distance "a" between two of another pair of the other cameras, but not a distance "b" between another pair of the cameras. Although camera array 800 in FIG. 8 illustrates three cameras 802, any number of cameras may be included in some embodiments. For example, additional cameras may be included in camera array 800 that form additional isosceles triangles, other types of triangles, other shapes of cameras, and/or any arrangement of cameras that do not fall along a line or a grid, etc.

As shown in FIG. 8, example array 800 may be included in a modular camera system that may include one or more logic modules (e.g., software, firmware, and/or hardware), not shown in FIG. 8, that may be used to capture and process image data using array 800. Further, such logic may be used to generate depth data utilizing the image data captured by array 800. Because array 800 uses less cameras than a conventional rectangular orthogonal camera array to generate sampling returns, employing array 800 may reduce both manufacturing costs and the amount of computation required to obtain depth data.

Figure 9:
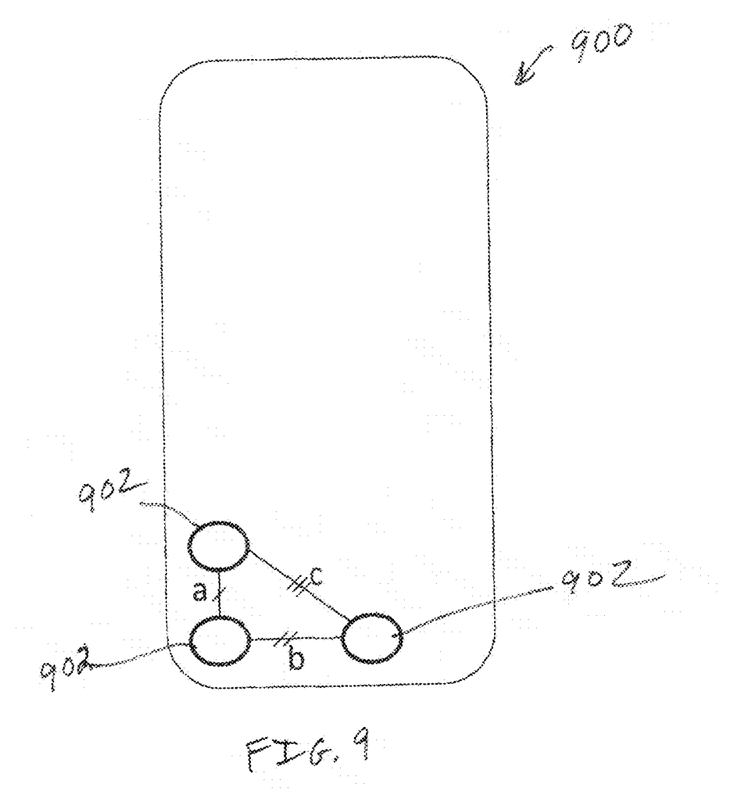

FIG. 9 illustrates an example camera array 900 in accordance with the present disclosure. As shown in this example, array 900 includes a two-dimensional (2D) assembly of three individual cameras 902 arranged such that a two-dimensional array of camera arranged such that the three cameras 902 form a scalene triangle and/or a right triangle where the distance "a" between two of the cameras does not equal the distance "b" between two of another pair of the other cameras, and neither the distance "a" nor "b" equals a distance "c" between another pair of the cameras. In some embodiments, the line between the cameras showing "a" and the line showing "b" may form a right angle. Although camera array 900 in FIG. 9 illustrates three cameras 902, any number of cameras may be included in some embodiments. For example, additional cameras may be included in camera array 900 that form additional scalene triangles, additional right triangles, other types of triangles, other shapes of cameras, and/or any arrangement of cameras that do not fall along a line or a grid, etc.

As shown in FIG. 9, example array 900 may be included in a modular camera system that may include one or more logic modules (e.g., software, firmware, and/or hardware), not shown in FIG. 9, that may be used to capture and process image data using array 900. Further, such logic may be used to generate depth data utilizing the image data captured by array 900. Because array 900 uses less cameras than a conventional rectangular orthogonal camera array to generate sampling returns, employing array 900 may reduce both manufacturing costs and the amount of computation required to obtain depth data.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. An apparatus, comprising:
   a two-dimensional array of cameras arranged such that the array comprises a non-rectangular array, wherein the array includes a reference camera arranged on or near a first baseline axis, on or near a second baseline axis, and on or near a third baseline axis, and wherein on or near the first baseline axis is arranged at least one camera in the array in addition to the reference camera, on or near the second baseline axis is arranged at least one camera in the array in addition to the reference camera, and on or near the third baseline axis is arranged at least one camera in the array in addition to the reference camera, the reference camera being the first camera, the at least one additional camera in the array on or near the second baseline axis is the second camera, and the at least one additional camera in the array on or near the third baseline axis is the third camera.

2. The apparatus of claim 1, wherein at least a first camera, a second camera, and a third camera in the array are located equidistant from each other.

3. The apparatus of claim 2, wherein the first, second, and third cameras are arranged in an equilateral triangle.

4. The apparatus of claim 1, wherein the array of cameras is arranged such that any particular camera in the array is equidistant from all immediately adjacent cameras.

5. The apparatus of claim 1, wherein at least a first camera, a second camera, and a third camera in the array are arranged in an isosceles triangle.

6. The apparatus of claim 1, wherein at least a first camera, a second camera, and a third camera in the array are arranged in a scalene triangle.

7. The apparatus of claim 1, wherein at least a first camera, a second camera, and a third camera in the array are arranged in a right triangle.

8. The apparatus of claim 1, wherein at least a first camera, a second camera, and a third camera in the array are arranged in a scalene right triangle.

9. The apparatus of claim 1, wherein the first, second, and third cameras are arranged in an equilateral triangle.

10. The apparatus of claim 1, wherein the array includes a second reference camera arranged on or near the first baseline axis, on or near a fourth baseline axis, and on or near a fifth baseline axis.

11. The apparatus of claim 10, wherein on or near the fourth baseline axis is arranged at least one camera in the array in addition to the second reference camera, and wherein on or near the fifth baseline axis is arranged at least one camera in the array in addition to the second reference camera.

12. The apparatus of claim 10, wherein on or near the first baseline axis is arranged at least one camera in the array in addition to the two reference cameras.

13. The apparatus of claim 11, wherein on or near the first baseline axis is arranged at least one camera in the array in addition to the two reference cameras.

14. A system comprising:
a two-dimensional array of cameras arranged such that the array comprises a non-rectangular array; and
logic configured to determine depth data by processing image data obtained from the array of cameras, the array including a reference camera arranged on or near a first baseline axis, on or near a second baseline axis, and on or near a third baseline axis, wherein on or near the first baseline axis is arranged at least one camera in the array in addition to the reference camera, on or near the second baseline axis is arranged at least one camera in the array in addition to the reference camera, and on or near the third baseline axis is arranged at least one camera in the array in addition to the reference camera.

15. The system of claim 14, wherein at least a first camera, a second camera, and a third camera in the array are located equidistant from each other.

16. The system of claim 15, wherein the first, second, and third cameras are arranged in an equilateral triangle.

17. The system of claim 14, wherein the array of cameras is arranged such that any particular camera in the array is equidistant from all immediately adjacent cameras.

18. The system of claim 14, wherein at least a first camera, a second camera, and a third camera in the array are arranged in an isosceles triangle.

19. The system of claim 14, wherein at least a first camera, a second camera, and a third camera in the array are arranged in a scalene triangle.

20. The system of claim 14, wherein at least a first camera, a second camera, and a third camera in the array are arranged in a right triangle.

21. The system of claim 14, wherein at least a first camera, a second camera, and a third camera in the array are arranged in a scalene right triangle.

22. The system of claim 14, wherein the reference camera is the first camera, the at least one additional camera in the array on or near the second baseline axis is the second camera, and the at least one additional camera in the array on or near the third baseline axis is the third camera.

23. The system of claim 22, wherein the first, second, and third cameras are arranged in an equilateral triangle.

24. The system of claim 14, wherein the array includes a second reference camera arranged on or near the first baseline axis, on or near a fourth baseline axis, and on or near a fifth baseline axis.

25. The system of claim 24, wherein on or near the fourth baseline axis is arranged at least one camera in the array in addition to the second reference camera, and wherein on or near the fifth baseline axis is arranged at least one camera in the array in addition to the second reference camera.

26. The system of claim 24, wherein on or near the first baseline axis is arranged at least one camera in the array in addition to the two reference cameras.

27. The system of claim 25, wherein on or near the first baseline axis is arranged at least one camera in the array in addition to the two reference cameras.

* * * * *